US007040562B2

(12) United States Patent
Sawant et al.

(10) Patent No.: US 7,040,562 B2
(45) Date of Patent: May 9, 2006

(54) ROTATING FEED DISTRIBUTOR

(75) Inventors: Ulhas S. Sawant, Hartland, WI (US); James A. Sheridan, Greendale, WI (US)

(73) Assignee: Innotech Solutions, LLC, Brookfield, WI (US)

( * ) Notice: Subject to any disclaimer, the term of this patent is extended or adjusted under 35 U.S.C. 154(b) by 157 days.

(21) Appl. No.: 10/793,092

(22) Filed: Mar. 4, 2004

(65) Prior Publication Data

US 2005/0194483 A1 Sep. 8, 2005

(51) Int. Cl.
*B02C 1/10* (2006.01)
*G01F 11/10* (2006.01)

(52) U.S. Cl. ...................................... 241/275; 222/367

(58) Field of Classification Search ................ 241/275, 241/301, 101.3, 101.2; 222/367, 333
See application file for complete search history.

(56) References Cited

U.S. PATENT DOCUMENTS

| | | | | |
|---|---|---|---|---|
| 1,920,488 | A | 8/1933 | Symons | |
| 2,207,858 | A * | 7/1940 | Gruender | 241/202 |
| 2,656,120 | A | 10/1953 | Roubal | |
| 3,212,720 | A | 10/1965 | Gasparac et al. | |
| 3,358,939 | A | 12/1967 | Gasparac et al. | |
| 3,614,023 | A * | 10/1971 | Archer et al. | 241/202 |
| 3,785,578 | A | 1/1974 | Kemnitz | |
| 3,813,046 | A | 5/1974 | Kemnitz et al. | |
| 3,834,631 | A * | 9/1974 | King | 241/26 |
| 3,951,348 | A | 4/1976 | Davis et al. | |
| 3,957,213 | A | 5/1976 | Stockman et al. | |
| 3,985,308 | A | 10/1976 | Davis et al. | |
| 3,985,309 | A | 10/1976 | Davis et al. | |
| 4,012,000 | A | 3/1977 | Davis et al. | |
| 4,106,707 | A | 8/1978 | Kemnitz | |
| 4,575,013 | A * | 3/1986 | Bartley | 241/275 |
| 4,662,571 | A * | 5/1987 | MacDonald et al. | 241/81 |
| 4,697,745 | A | 10/1987 | Sawant et al. | |
| 4,739,937 | A * | 4/1988 | Carpenter et al. | 241/79.1 |
| 4,750,681 | A | 6/1988 | Sawant et al. | |
| 4,754,932 | A * | 7/1988 | Kmiotek et al. | 241/31 |
| 5,137,220 | A | 8/1992 | Rose et al. | |
| 5,277,370 | A * | 1/1994 | Schatz | 241/80 |
| 6,129,297 | A | 10/2000 | Sawant et al. | |
| 6,213,418 | B1 | 4/2001 | Gabriel et al. | |
| 6,227,472 | B1 | 5/2001 | Ryan et al. | |

* cited by examiner

*Primary Examiner*—Faye Francis
(74) *Attorney, Agent, or Firm*—Ryan Kromholz & Manion, S.C.

(57) ABSTRACT

A rotating feed distributor for use in connection with rock crushers and other devices is disclosed. The feed distributor has a platform for receiving rocks and a chute having an inlet and outlet wherein the rocks pass through. The feed distributor is designed to reduce wear and evenly distribute rocks into the crusher by providing a sheaveless drive system that efficiently rotates the chute.

16 Claims, 4 Drawing Sheets

ROTATING FEED DISTRIBUTOR

BACKGROUND OF THE INVENTION

This invention relates to cone crushers used for crushing rocks and, more specifically, feed distributors used in combination with rock crushers and other devices.

Generally, a belt conveyor or feeder delivers rocks and stones into a crusher. The rocks will ride up the conveyor, located above the input of the crusher. The rocks will be dumped under the force of gravity into the crusher, which will then crush the rocks into a predetermined size. Preferably, the rocks will pass through a feed distributor, which will assist in dispersing the rocks into the crusher.

Since rocks fed into the crusher are not always of the same size and shape, they will not necessarily be crushed to a final uniform size. However, it is preferable to have the crushed rocks be within a relative range and size, which may mean that the rocks and stones need to be recrushed. Furthermore, the final crushed rock product should have a uniform gradation of rock sizes and shapes, rather than having a batch of stones that may contain very fine dust as a product and another batch that only contains larger rocks. Such segregation of the rocks is not advantageous as it can lead to a less saleable end product. In the event the rocks are too large for specifications, the rocks will be recycled back into the crusher to be crushed again.

To alleviate problems of nonuniformity, previous designs and inventions have focused on improving the crushers so that the resultant crushed rocks will be more uniform in size. However, it has been observed that one of the reasons for inconsistent rock gradation is that the feed rocks are not evenly distributed into the crusher and arrive in the crusher in a segregated fashion. Rocks will generally fall into the feeder under the force of gravity, which means small rocks will fall together and larger rocks will separately fall together. Consequently, the rocks may not be evenly distributed, which leads to potentially uneven crushing of the rocks. Rocks outside of a predetermined range will need to be recycled, which is not necessarily the most efficient process.

Wear of the specific parts of prior feed distributors is also a problem. When rocks-fall upon the distributors and the chutes used in the distributors, the force of gravity tends to wear and erode the distributor components. As a result the components need to be replaced, which leads to more downtime of the system and, consequently, reduces the efficiency of the overall system.

Previous inventions, such as Ryan et al., U.S. Pat. No. 6,227,472, discuss devices that will spin rocks into the sides of the crusher. However, the device in Ryan causes buildup within the device, and, since the device is located within the crusher, is not easily cleaned or serviced. Other devices, such as Kemnitz, U.S. Pat. No. 4,106,707, contemplate feed distributors, but do not allow for control and efficiency as is found in the present invention. Furthermore, prior art designs have been observed to comprise drive means that are susceptible to dust and dirt and may unduly slip when driving the feed distributor, such as Gasparac et al., U.S. Pat. No. 3,212,720. The present invention addresses this issue by introducing a system for evenly distributing feed rocks into a crusher.

SUMMARY OF THE INVENTION

The present invention provides a feed distributor for use in connection with rock crushers. The distributor sits beneath the top end or output end of a conveyor or feeder used in conjunction with a rock crusher. The conveyor or feeder delivers rocks from a supply source to the distributor that is positioned over the crusher input. The distributor receives the rocks onto its feed platform, where the rocks travel from the feed platform into a feed chute comprising an inlet and an outlet. The feed chute has an outer and inner tube, with the outer tube rotating and the inner tube being relatively stationary. The outer tube is driven by a motor coupled to a gear reducer. The use of the two tubes lessens the wear on the feed distributor. The rotating outer tube allows the rocks to be evenly distributed throughout the rock crusher and reduces segregation of the rocks, which improves the efficiency of the rock crusher.

The distributor provides for an even distribution of the rocks before entering the crusher, thereby minimizing uneven rock buildup within the crusher and further minimizing the need for recycling of rocks that are not crushed within predetermined limitations. The feed distributor is further designed to protect the power means and other moving parts from dust and other particles, thereby reducing the overall wear on the distributor. The arrangement of the belts and drive means of the distributor also provides for a secure and low maintenance drive system, without the necessity of using a sheave around the rotating outer tube.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
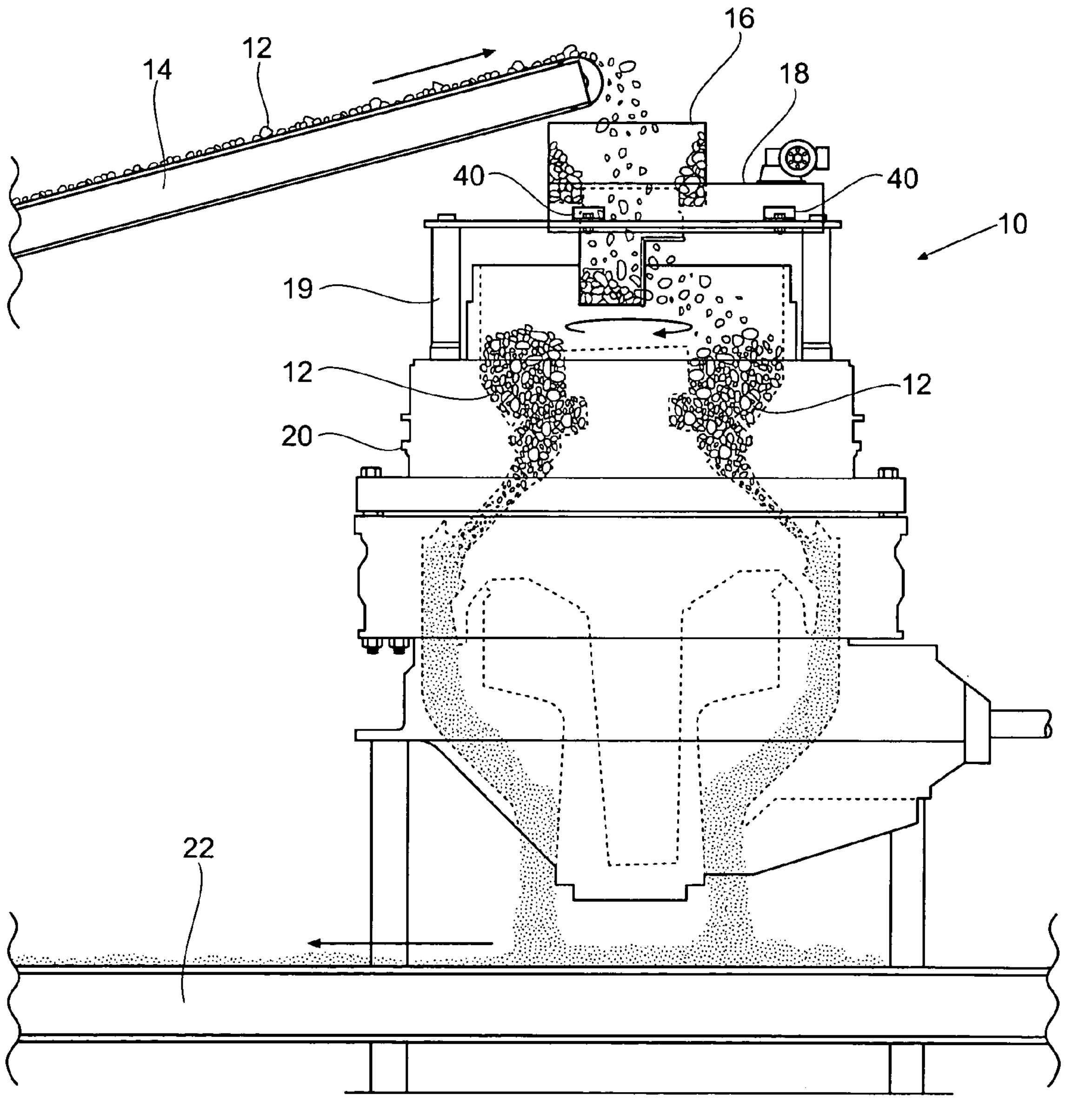
FIG. 1 is a side view of the present invention in combination with a rock crusher and a feed conveyor.

FIG. 1 shows a side view of a rock crushing system 10 employing the present invention. A plurality of rocks 12 is fed upwards on a conveyor 14. The conveyor 14 delivers the rocks 12 through a feedbox 16 and into a feed distributor 18, which is the focus of the present invention. The feed distributor 18 is designed for 360° rotation and delivers the rocks 12 uniformly to the crusher 20. The distributor 18 may be mounted to the crusher, the conveyor, or may be mounted independently. A frame or mount 19 holds the feed distributor 18 in place over the crusher 20. The frame 19 can encompass a wide range of shapes and sizes that will adequately mount the distributor 18 over the crusher 20. The feedbox 16 should be considered a stand-alone feature that is not part of the present invention. The feed distributor 18 passes the rocks 12 into a crusher 20, which rotates or gyrates and crushes the rocks 12. The rocks 12 exit below the crusher 20, possibly onto a second conveyor 22, which will then take the crushed rocks 12 away to be further sorted, or to be recycled and reprocessed in the rock crushing system 10.

Figure 2:
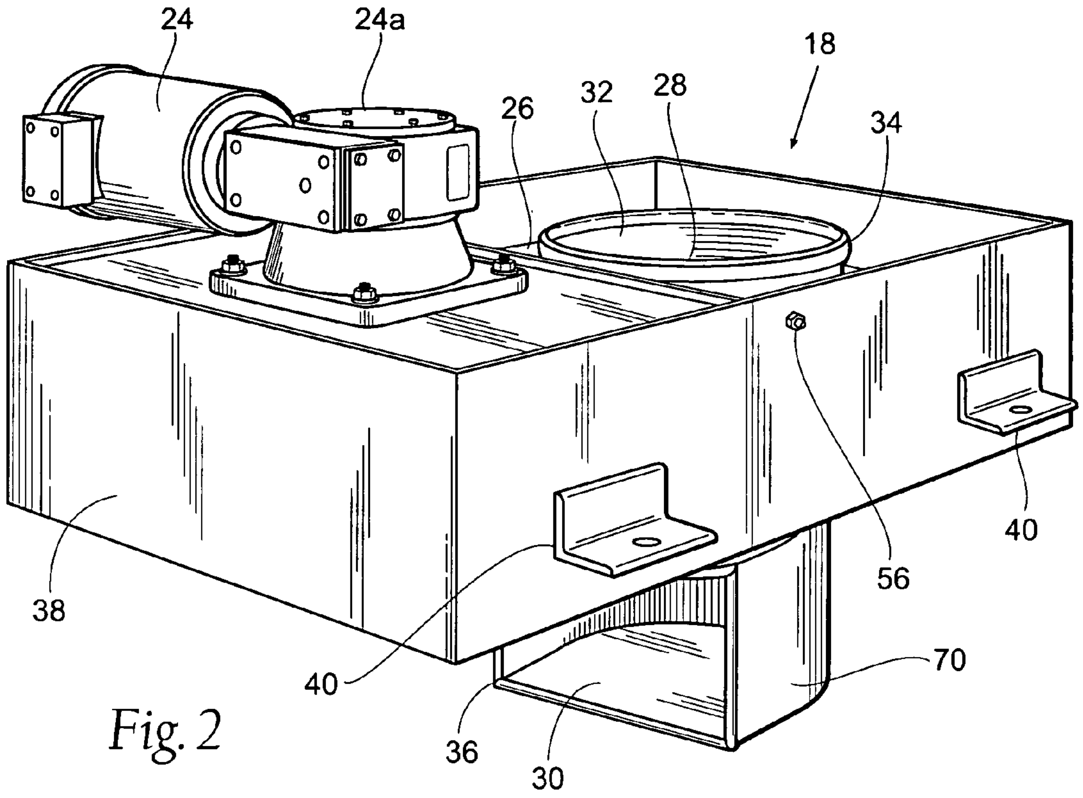
FIG. 2 is a perspective view of the present invention.

FIG. 2 shows a perspective view of the feed distributor 18. A power means 24 of any sufficient design or size that will adequately allow the distributor 18 to operate powers the feed distributor 18. The output of the motor 24 is rotationally coupled to a gear reducer 24*a*, which in turns drives the necessary components of the feed distributor 18. The distributor 18 has three main areas that the rocks will encounter when proceeding towards the crusher: a feed platform 26, an inlet 28, and an outlet 30. The inlet 28 and the outlet 30 generally are opposing sections of a tubular chute 32 containing a coextensive bore within the chute 32, which will be described in more detail with respect to the subsequent figures. When rocks 12 enter into the distributor 18, as shown in FIG. 1, the rocks 12 first fill up on the feed platform 26. After enough rocks have accumulated on the platform 26, the rocks 12 will pass into the inlet 28, further traveling through to the outlet 30, where they will eventually end up in the crusher 20 (see FIG. 1). The inlet 28 comprises a reinforced lip 34, which helps to extend the life of the inlet 28. Similarly, a second lip 36 is located around the outlet 30 to also extend the life of the outlet 30. The lips 34 and 36 may be designed in any fashion, such as from a metal rod or similar material that may be welded to the inlet 28 and the outlet 30, that will reduce wear on the feed box 16.

Still referring to FIG. 2, the feed distributor 18 comprises a housing 38, which prevents dust and other debris from interfering with internal components of the feed distributor 18. The housing 38 may be of any shape that will efficiently protect the internal components and not interfere with the functions of the distributor 18. Preferably, the housing 38 is designed so that it seals off the inner parts of the distributor 18 from the outside elements. A plurality of brackets 40 is provided on the outside of the housing 38. The brackets 40 provide an area for the distributor 18 to be mounted onto the frame 19 over the crusher 20 (see FIG. 1). The brackets 40 should be understood to encompass any mounting means that will sufficiently secure the distributor 18 to the crusher 20. Similarly, the brackets 40 together with the frame 19 may be of any design. For instance, the distributor 18 does not necessarily need to be firmly bolted down, but may be held in place with stop blocks (not shown).

Figure 3:
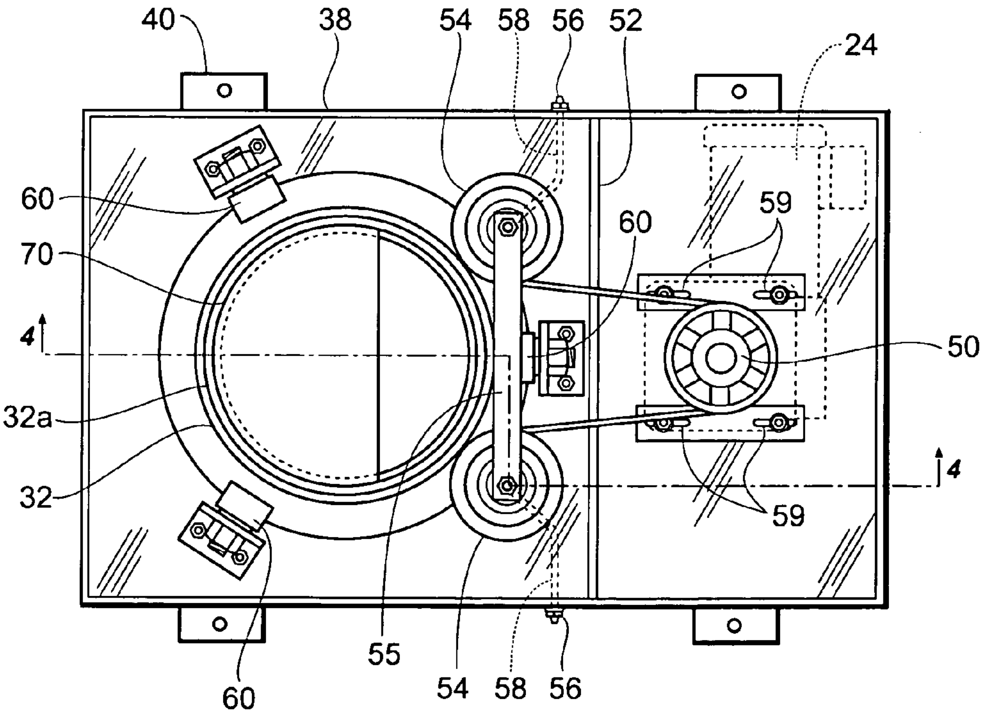
FIG. 3 is a bottom view of the present invention.

FIG. 3 shows a bottom view of the distributor 18. The output shaft of gear reducer 24*a* (shown in phantom) is coupled to a drive wheel, sheave, or pulley 50, which is connected to a drive belt 52. The drive belt 52 surrounds the tubular chute 32. The drive belt 52 is preferably of a design, such as a micro V-belt, that allows the chute 32 to rotate without a sheave being located on the outside of the chute 32. As the drive belt 52 passes around the drive wheel 50 to the tubular chute 32, the drive belt 52 encounters tensioning wheels or pulleys 54. The tensioning wheel 54, which may or may not be grooved to more closely resemble the shape of the drive belt 52, are connected by a crossbar 55 that may be adjusted to fine-tune the overall tension of the drive belt 52, but generally is not necessary under ordinary operating conditions. The crossbar 55 holds the tensioning wheels 54 close to the chute 32, which minimizes deflection of the drive belt 52 away from the chute 32. The biased arrangement of the tensioning wheels 54 allows the drive belt 52 more completely to surround the chute 32. The more inclusive wrap design of the drive belt 52 is advantageous over previous feed distributors. Because the belt makes more contact with the chute 32, there is less chance that the belt 52 will slip, which improves the efficiency of the distributor 18. Furthermore, the arrangement provides for a sheaveless arrangement not found in the prior art. Consequently, less dirt and debris has a chance to interfere with the movement of the belt 52, thereby lessening the need for maintenance on the system and providing for a more consistent rotation of the chute 32.

As shown in FIG. 3, the tensioning wheels 54 are kept lubricated by corresponding grease fittings 56 located on the outside of the housing 38 (also shown in FIG. 1), which are connected to the tensioning wheels 54 by corresponding hoses or conduits 58 (shown in phantom). Thus, the tensioning wheels 54 may be kept lubricated without having to expose the tensioning wheels 54 and other internal contents of the distributor 18 to dirt and other harmful elements. Likewise, the lubrication means, together with the arrangement of the crossbar 55, provides for a system that greatly reduces any need to adjust the drive belt 52 or the tensioning wheels 54. It should be noted that preferably the drive wheel 50 and the gear reducer 24*a* are designed so that they are slidable forward or backwards towards the chute 32 prior to installation within adjusting slots 59, thereby providing the necessary tension for the drive belt 52. Once the proper tension is achieved and the gear reducer 24*a* and the drive wheel 50 are secured, minimal adjustments and maintenance are required for the distributor 18 during normal operation.

Still referring to FIG. 3, a plurality of vertical support means 60 are shown mounted to the housing 38. The support means 60 preferably are designed as rollers, and are arranged circumferentially around the chute 32, resting upon an exterior radial flange section 32*a* of the chute 32. The rollers 60 preferably are arranged in an equally spaced arrangement. Furthermore, the rollers 60 provide vertical support for the chute 32 and assist to keep the chute 32 properly aligned when in use. Combined with the tensioning wheels 54, which provide horizontal support for the chute 32, the rollers 60 contribute to the overall stability and efficiency of the feed distributor 18. Because of the support offered by the tensioning wheels 54 and the rollers 60, the chute 32 may operate with minimal adjustments during the operating process.

Figure 4:
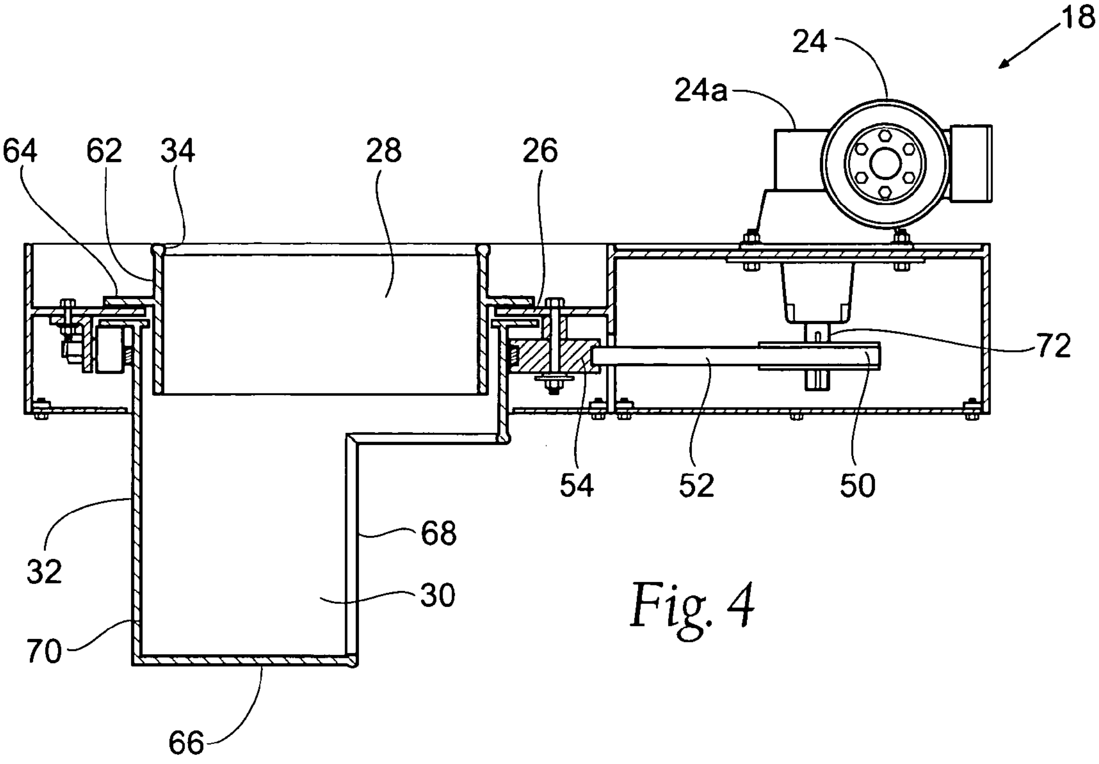
FIG. 4 is a side view of the present invention taken along line 4—4 of FIG. 3.

FIG. 4 shows a side view of the feed distributor 18. As discussed in FIG. 2, the inlet 28 and the outlet 30 comprise the tubular chute 32. Located within the inlet 28 is a wear sleeve 62. The wear sleeve 62 preferably extends a distance above the inlet 28 and also a distance below the inlet 28. Previously stated, the lip 34 helps to extend the life of the inlet 28. When the wear sleeve 62 is employed in the feed distributor 18, the previously described lip 34 is located at the top of the wear sleeve 62. While the wear sleeve 62 may be secured to the inlet 28, it preferably rests upon the feed platform 26. A laterally extending flange 64 assists in the wear sleeve 62 resting on the feed platform 26. When worn down, the wear sleeve 62 may be easily removed and replaced with a new sleeve.

The platform 26, as shown in FIG. 4, preferably has a square shape, with the inlet 28 and the wear sleeve 62 centered within the platform 26. The height of the platform 26 is shown as being approximately the same height that the wear sleeve 62 extends upwardly from the inlet 28. However, any height that will allow the platform to operate as a rock bed for the distributor 18 will suffice.

Further in FIG. 4, the outlet 30 has a base 66, an open side 68, and at least one closed side 70. The open side 68 and the closed side or sides 70 extend laterally upward from the base 66. Preferably, the closed side 70 has a curvilinear shape (see FIGS. 2 and 3), which prevents rocks from unnecessarily building up in the corners of the outlet 30. However, the outlet 30 may have straight sides 70, forming such other geometric shapes, and still fall within the scope of the invention. The outlet 30 is relatively large, thereby increasing throughput capacity of the distributor 18.

Referring further to FIG. 4, the motor 24 and the gear reducer 24*a* are shown connected to a shaft 72, which drives the drive wheel 50. The drive wheel 50 rotates the drive belt 52, which passes the tension wheels 54 and passes around the chute 32, causing the chute 32 to rotate. As the chute 32 rotates, the wear sleeve 62 preferably remains stationary, which contributes to even wear of the sleeve 62, thereby extending the life of the wear sleeve 62.

Figure 4A:
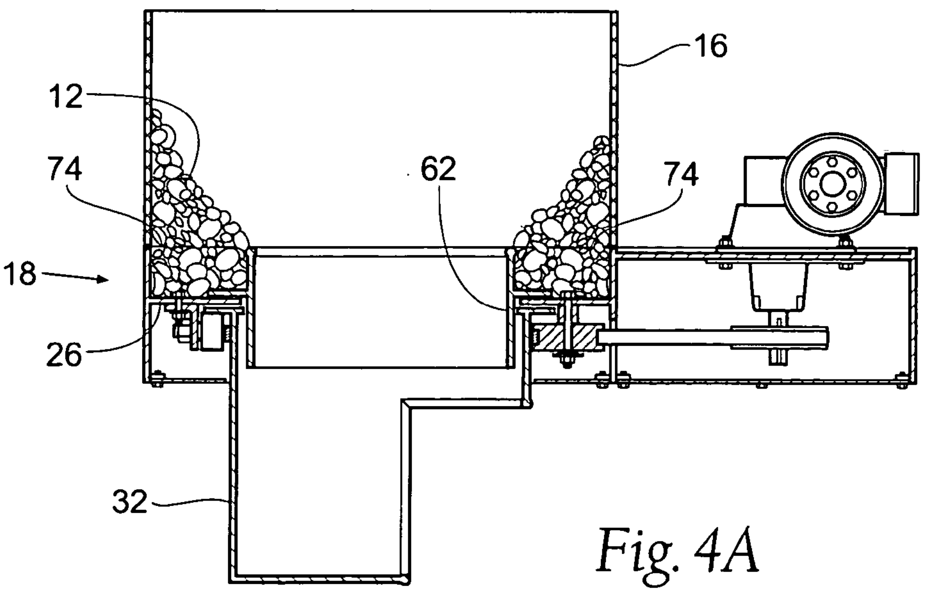
FIGS. 4A–4B are sectional side views of the present invention and feedbox receiving rocks.

FIG. 4A shows a side view of the distributor 18 with rocks 12 being fed into the distributor 18. As previously shown in FIG. 1, the feedbox 16 is located directly over the platform 26. A suitable feedbox 16 will securely fit onto the platform 26 in a way that will contribute to the platform 26 acting as an accumulator or “dead bed” 74 for the distributor 18. The dead bed 74 decreases wear on the distributor 18, the chute 32, and the wear sleeve 62. Because the rocks 12 build up on the platform 26 as opposed to constantly falling down upon the chute 32 and the wear sleeve 62, the wear will be reduced, because there is rock on rock sliding, as opposed to rock on distributor sliding.

Figure 4B:
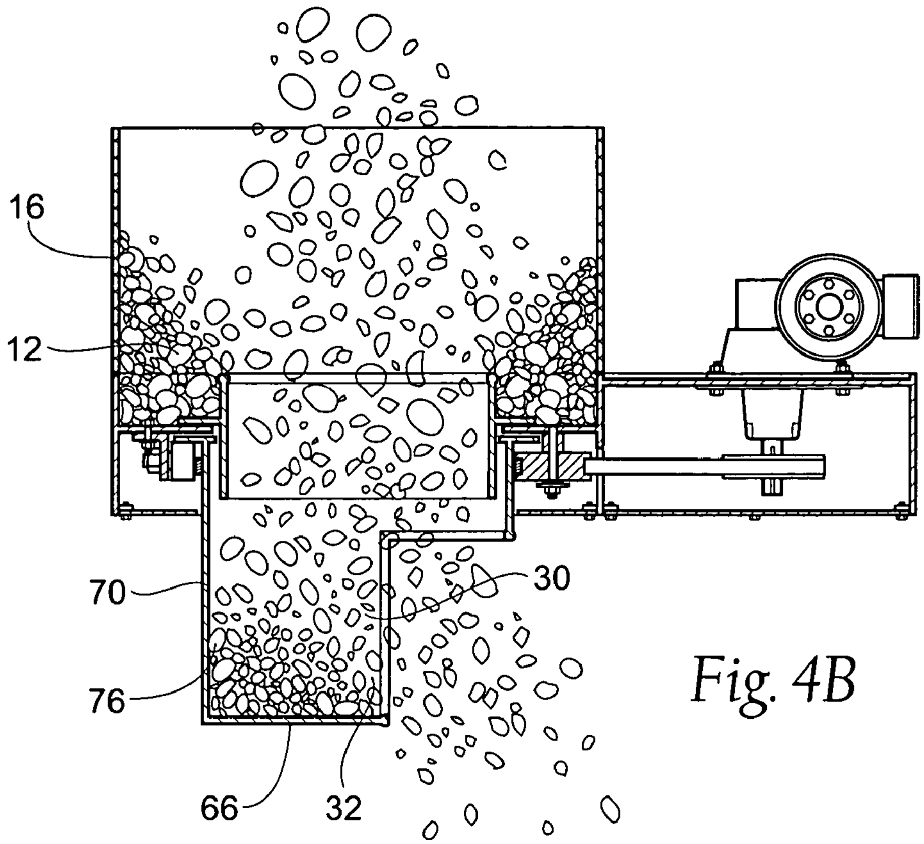

FIG. 4B shows the distributor 18 of FIG. 4A after more rocks 12 have fed been into the distributor 18. A second dead bed 76 is formed in the outlet 30, defined by the base 66 and the closed side 70. The second dead bed 76 further reduces wear on the chute 32 and the base 66. Furthermore, the sloped shape of the dead bed 76 allows the rocks 12 to easily exit the outlet 30 without unnecessary wear on the chute 32. However, the rotation of the chute 32 still provides that the rocks 12 are evenly distributed.

Figure 5:
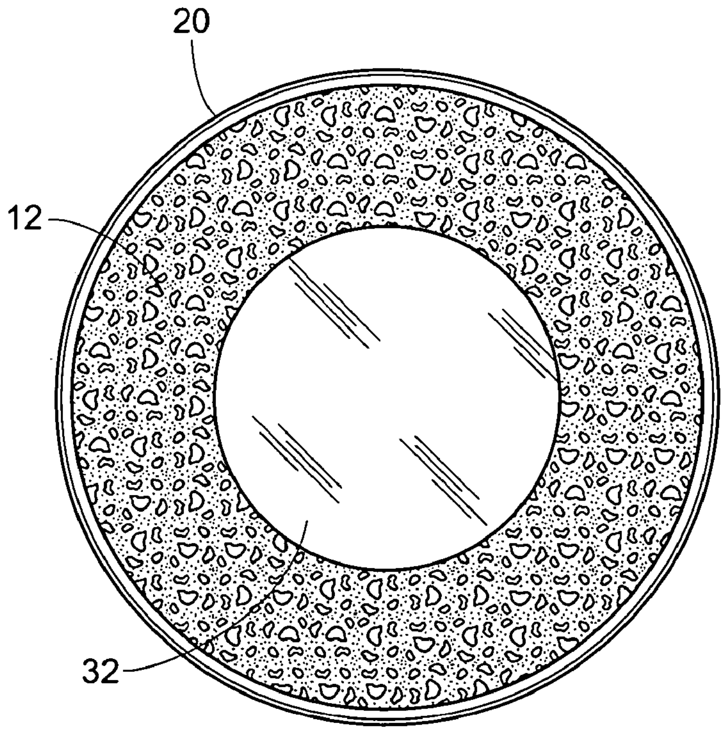
FIG. 5 is overhead view of a crusher used in connection with the present invention.

FIG. 5 shows an overhead view of the crusher 20 and the chute 32. Because of the arrangement of the present design, the rocks 12 are evenly distributed throughout the crusher 20. Because the rocks 12 are fed into the crusher 20 with less size segregation, the crusher 20 will more efficiently crush the rocks 12. Likewise, it is advantageous that the chute 32 is centered over the crusher 20 for further uniformity of the rocks 12.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A rotating feed distributor for a stone crusher, said distributor comprising:

a housing;

a rotatable tubular chute for receiving stones, said tubular chute supported in said housing, said chute forming a bore, said bore having an inlet portion and an outlet portion;

support means for vertically supporting said chute;

power means; and drive means for rotating said chute, said drive means comprising:

a drive belt coupled to said power means and to said chute; and at least one tensioning wheel for said drive belt, said tensioning wheel rotatably biasing said drive belt to said tubular chute.

2. The feed distributor according to claim 1 wherein said vertical support means comprises a plurality of rollers, said rollers contacting an outer flange portion of said chute.

3. The feed distributor according to claim 1 wherein said inlet portion includes a tubular wear sleeve, said wear sleeve residing within and coaxially to said bore.

4. The feed distributor according to claim 3 wherein said wear sleeve extends a predetermined distance within said inlet portion.

5. The feed distributor according to claim 3 wherein said wear sleeve further comprises a laterally extending flange, said flange supporting said wear sleeve on said housing.

6. The feed distributor according to claim 1 wherein said outlet portion of said chute comprises a base, an open side, and a closed side, said open and closed sides extending upwardly from base, said open side allowing distribution of said stones.

7. The feed distributor according to claim 1 further comprising mounting means for supporting said distributor above said crusher.

8. The feed distributor according to claim 1 further comprising two tension wheels, said tension wheels being connected by a crossbar.

9. The feed distributor according to claim 1 wherein said drive means are located inside of said housing.

10. The feed distributor according to claim 1 further comprising a feed platform, said feed platform located on said housing around said inlet portion of said chute.

11. A rotating feed distributor for a stone crusher, said distributor comprising:

a housing;

a rotatable tubular chute for receiving stones, said chute having a radially extending flange portion, said tubular chute supported in said housing, said chute forming a bore, said bore having an inlet portion and an outlet portion;

a power means; and drive means for rotating said chute, said drive means comprising:

a drive belt coupled to said power means and to said chute; and a plurality of rollers located circumferentially of said chute, said rollers contacting said flange portion of said chute, said rollers providing vertical support for said chute.

12. The feed distributor according to claim 11 wherein said inlet portion includes a substantially coaxial tubular wear sleeve, said wear sleeve residing within said bore.

13. The feed distributor according to claim 12, wherein said wear sleeve further comprises a laterally extending flange, said flange supporting said wear sleeve on said housing.

14. The feed distributor according to claim 12 wherein said tubular sleeve further comprises a section extending upwardly from said inlet portion, said upwardly extending portion further comprising a reinforced lip.

15. The feed distributor according to claim 11 wherein said drive means are located completely within said housing.

16. The feed distributor according to claim 11 further comprising a feed platform, said feed platform located on said housing around said inlet portion of said chute.

* * * * *